US009555727B2

(12) United States Patent
Kotz

(10) Patent No.: US 9,555,727 B2
(45) Date of Patent: Jan. 31, 2017

(54) HEADREST

(71) Applicant: Maximilian Kotz, Rieden (DE)

(72) Inventor: Maximilian Kotz, Rieden (DE)

(73) Assignee: GRAMMER AG, Amberg (DE)

( * ) Notice: Subject to any disclaimer, the term of this patent is extended or adjusted under 35 U.S.C. 154(b) by 7 days.

(21) Appl. No.: 13/773,797

(22) Filed: Feb. 22, 2013

(65) Prior Publication Data
US 2013/0229042 A1 Sep. 5, 2013

(30) Foreign Application Priority Data

Feb. 22, 2012 (DE) .................. 10 2012 003 367

(51) Int. Cl.
B60N 2/48 (2006.01)
B60N 2/44 (2006.01)

(52) U.S. Cl.
CPC ............. B60N 2/4805 (2013.01); B60N 2/443 (2013.01); B60N 2/4829 (2013.01); B60N 2/4864 (2013.01); B60N 2/4885 (2013.01)

(58) Field of Classification Search
CPC combination set(s) only.
See application file for complete search history.

(56) References Cited

U.S. PATENT DOCUMENTS

| 4,552,403 | A | * | 11/1985 | Yindra | 297/330 |
| 4,821,456 | A | * | 4/1989 | Nogaki | 49/362 |
| 5,112,286 | A | * | 5/1992 | Jones | 482/100 |
| 5,195,390 | A | * | 3/1993 | Nogaki | 74/424.75 |
| 5,306,073 | A | * | 4/1994 | Rees | 297/362.14 |
| 5,338,100 | A | * | 8/1994 | Rees | 297/452.1 |
| 5,570,508 | A | * | 11/1996 | Ress | 29/897.3 |
| 5,772,280 | A | | 6/1998 | Massara | |
| 6,478,378 | B2 | * | 11/2002 | Muhlberger et al. | 297/344.12 |
| 6,733,075 | B2 | * | 5/2004 | Schumann et al. | 297/344.12 |
| 6,902,234 | B2 | * | 6/2005 | Becker et al. | 297/216.1 |
| 6,921,133 | B2 | * | 7/2005 | Taoka et al. | 297/216.16 |
| 6,948,756 | B2 | * | 9/2005 | Liu | 296/68.1 |
| 7,044,543 | B2 | * | 5/2006 | Schumann et al. | 297/216.1 |
| 7,077,471 | B2 | * | 7/2006 | Schumann et al. | 297/216.1 |
| 7,338,118 | B2 | * | 3/2008 | Ichikawa et al. | 297/216.1 |
| 8,763,484 | B2 | * | 7/2014 | Yinko et al. | 74/89.38 |
| 2002/0011746 | A1 | * | 1/2002 | Muhlberger et al. | 297/344.12 |

(Continued)

FOREIGN PATENT DOCUMENTS

DE 3519351 A 12/1986
DE 29723240 U 7/1998

(Continued)

Primary Examiner — David E Allred
(74) Attorney, Agent, or Firm — Andrew Wilford

(57) ABSTRACT

The invention relates to a headrest that is retained on a vehicle seat by at least one support rod (12) and that has at least one adjustment part (13) that can be moved relative to the back rest by at least one drive mechanism (14, 15, 16, 22) having at least one first drive (14, 15) that is fixed to the adjustment part and a second drive (16, 22) that is fixed to the back rest.
The special feature is that the drive (14, 15, 16, 22) has an overload safety device (17) that can be moved from a starting position into a release position when a maximum force acting on the adjustment part (13) is exceeded, and, in the release position, the drive (14, 15, 16, 22) is at least partially relieved of the force acting on the adjustment part (13).

7 Claims, 15 Drawing Sheets

(56) References Cited

U.S. PATENT DOCUMENTS

| | | | |
|---|---|---|---|
| 2002/0043857 A1* | 4/2002 | Glance | 297/378.12 |
| 2004/0000807 A1 | 1/2004 | Pal et al. | |
| 2006/0087167 A1 | 4/2006 | Kraft et al. | |
| 2011/0113904 A1* | 5/2011 | Czechtizky et al. | 74/89.23 |
| 2011/0226075 A1* | 9/2011 | Nguyen et al. | 74/89.38 |

FOREIGN PATENT DOCUMENTS

| | | |
|---|---|---|
| DE | 19800040 A | 7/1999 |
| DE | 102004030319 A | 1/2006 |
| DE | 102009049946 A | 3/2011 |

\* cited by examiner

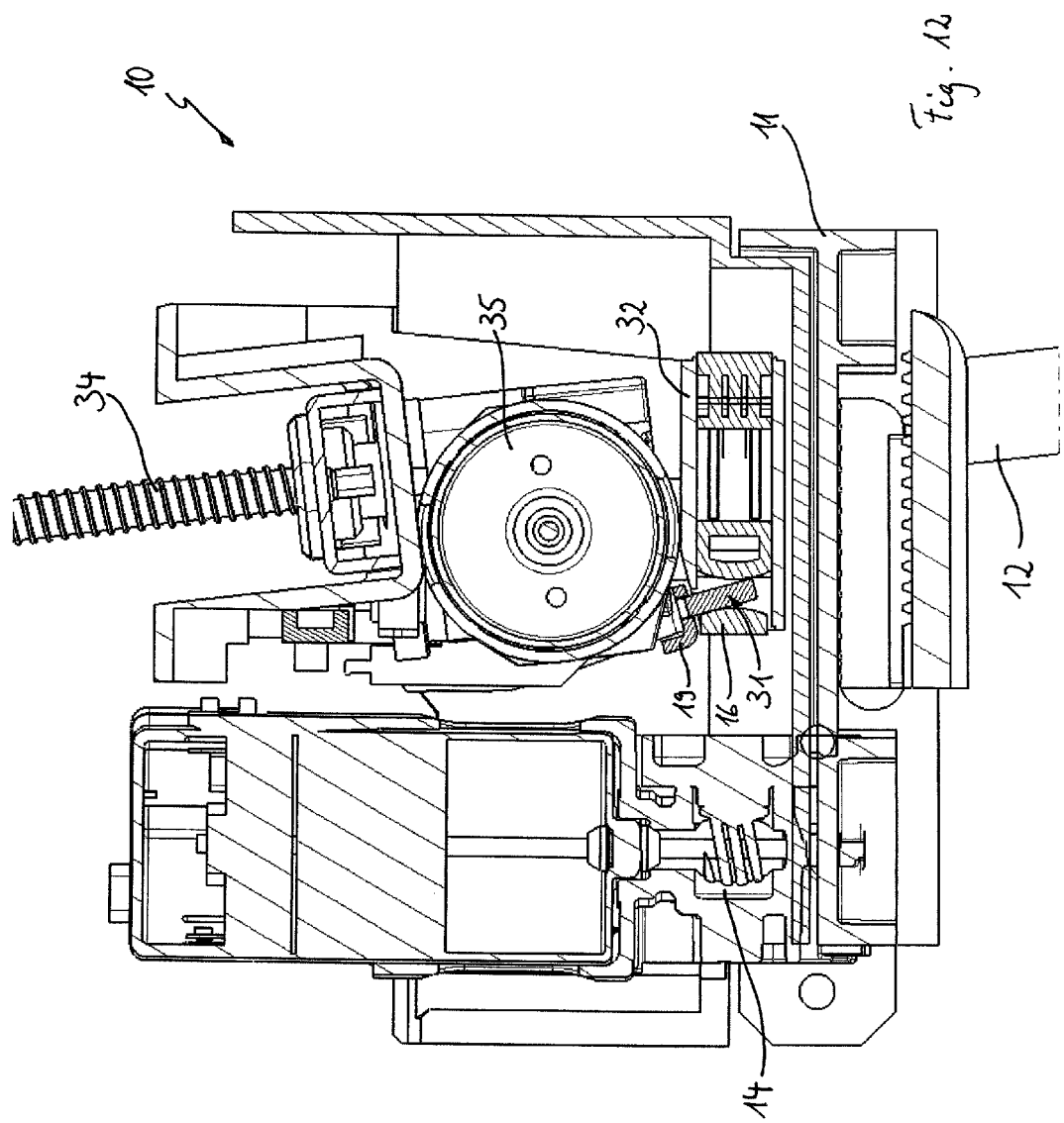

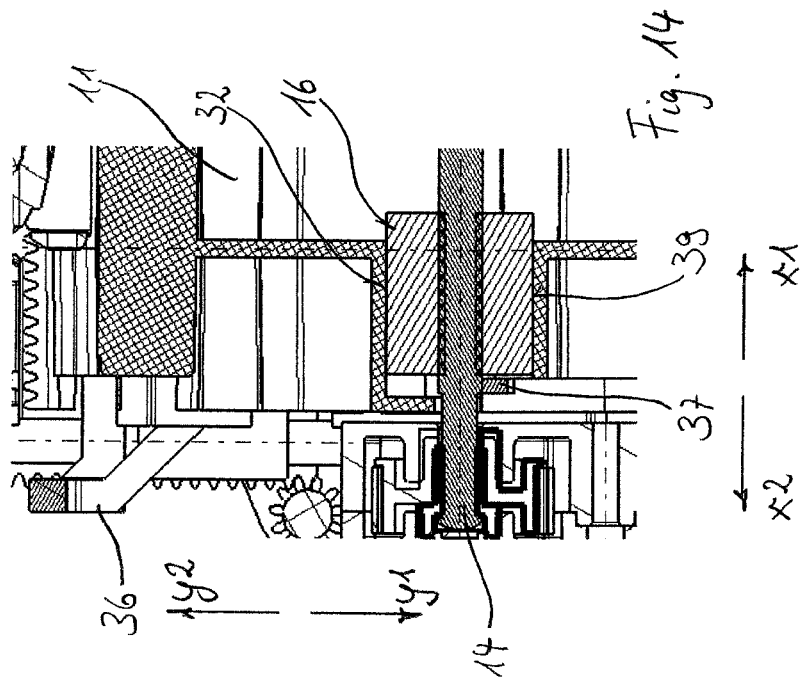
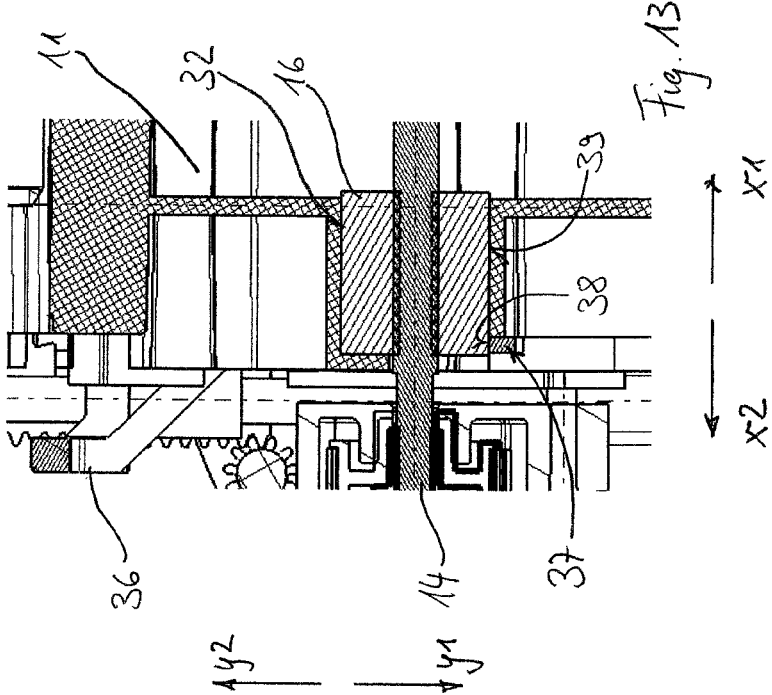

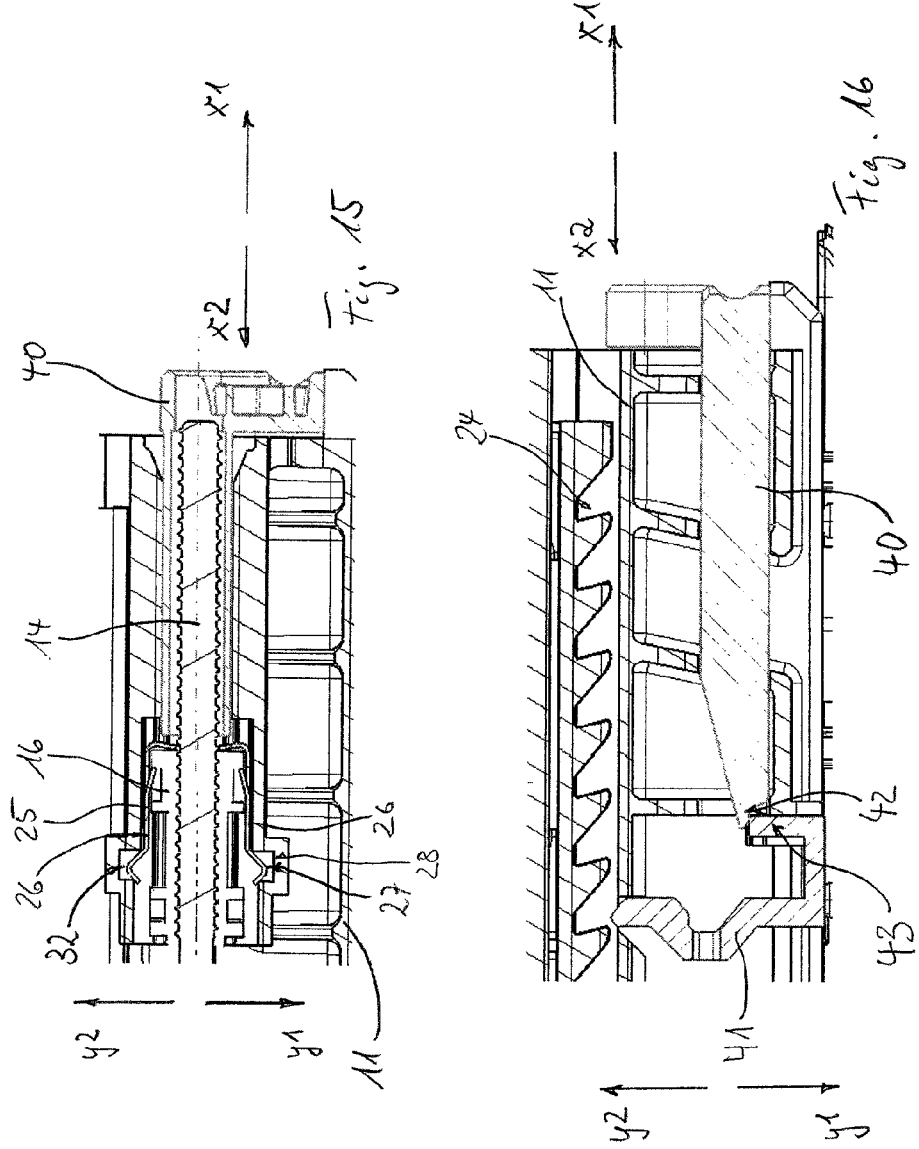

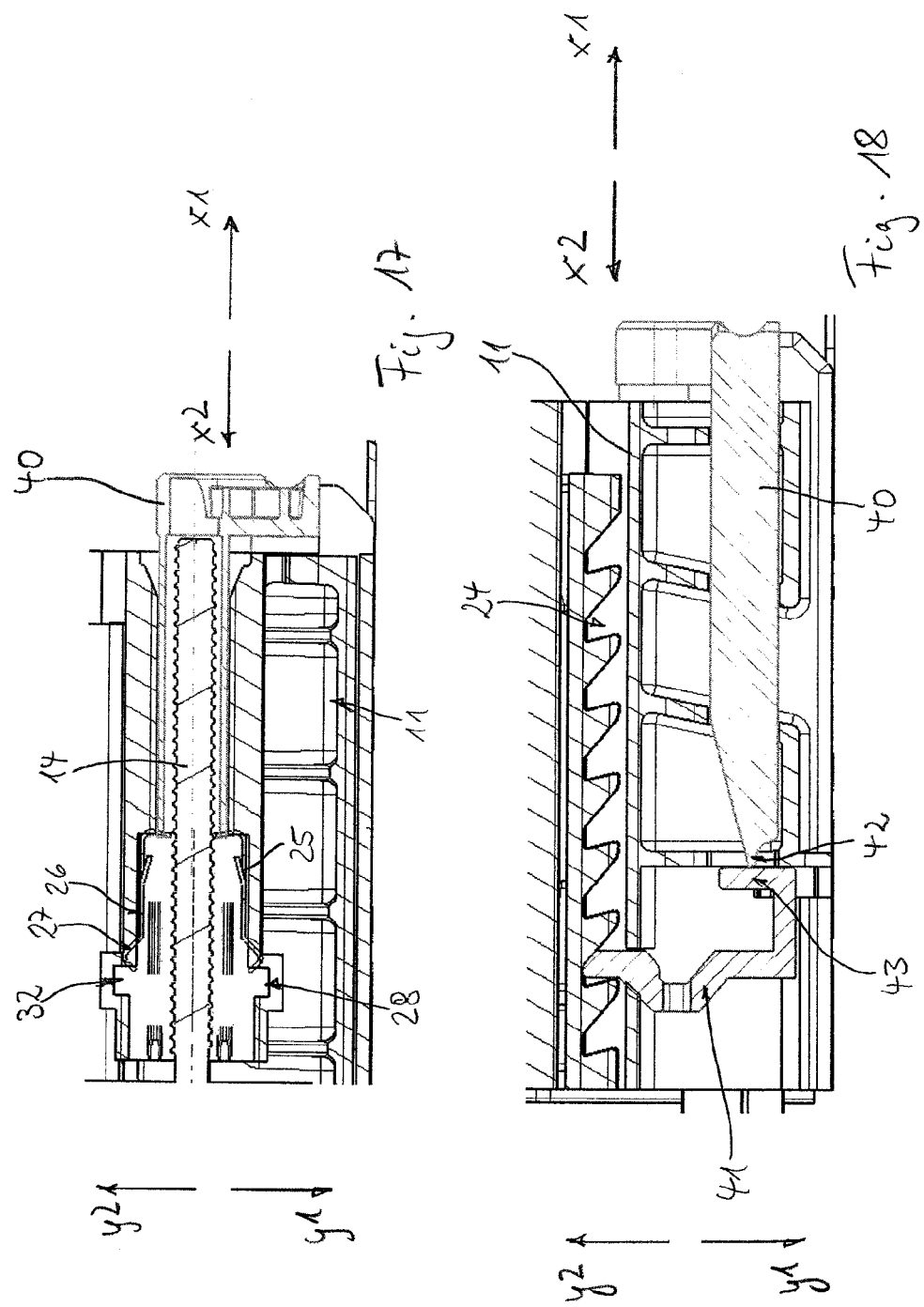

HEADREST

FIELD OF THE INVENTION

The invention relates to a headrest.

BACKGROUND OF THE INVENTION

Such a headrest is described in DE 35 19 351 for example. The headrest is vertically adjustable in that a head box that carries the head cushion can be moved relative to the support rods by an electric drive motor. The drive train is provided with an overload safety device in such a way that the drive motor and shafts that drive the head box are rotationally connected by a rotationally elastic coupling. According to a second aspect of the invention, the overload protection consists in that the shafts each have drive wheels that run on a track of the support rod. The drive wheel is designed as a friction wheel.

A headrest that has a support plate fixed to support rods and a plate movable in the X-direction relative to the support plate is described in DE 10 2009 049 946. A guide has rods of the plate and mounted in guide bushes of the support plate. The plate is driven by a shaft provided with two gears each meshing with a toothed rail fixed to the guide rod. A ratchet wheel is fixed to the drive shaft. A latch can be releasably engaged with the ratchet wheel. When the latch is engaged with the ratchet wheel, movement of the plate is blocked.

A headrest that can be vertically adjusted by gear teeth is described in DE 198 00 040, the angle of the headrest section being simultaneously set by the height adjustment.

DE 297 23 240 describes a headrest with which the seat height adjustment is coupled to the headrest height adjustment. When the seat is raised, the headrest adjusts itself downward. When the seat is lowered, the headrest adjusts itself upward. In one embodiment, the headrest height adjustment is driven by a toothed shaft that meshes with gear teeth of the headrest support rods.

A headrest with which a headrest section is mounted for vertical adjustment on support rods is described in DE 10 2004 030 319. Gear teeth that mesh with a drive pinion in order to vertically position the headrest are provided on the support rods. A flexible head cushion is placed over the headrest section and is designed so that it can be changed in shape.

OBJECT OF THE INVENTION

The object of the invention was to create a headrest that has at least one adjustment facility and yet that provides a high level of safety.

SUMMARY OF THE INVENTION

The headrest is retained on a backrest of a vehicle seat by at least one support rod. The headrest comprises at least one adjustment part that can be moved relative to the back rest by at least one drive mechanism. For example, the adjustment part can be adjusted horizontally and moved relative to a support that is mounted on the support rod. In addition or according to an alternative embodiment, the support can be moved relative to the support rod or relative to the back rest. The headrest is provided with a first drive that is fixed indirectly or directly to the adjustment part. Furthermore, the headrest is provided with a second drive that is fixed indirectly or directly to the back rest. For example, the second drive is fixed to the support of the headrest.

"Support" means a part that is fixed immovably or movably to the rod. The support can be fixed to two rods, for example, and connect these to one another.

The drive mechanism has an overload safety device that can be moved between a starting position and a release position. When a maximum force acting on the adjustment part is exceeded, the overload safety device can be moved from the starting position to the release position. In the release position, the drive mechanism is partially or completely relieved of the force acting on the adjustment part. For example, a force from the adjustment part no longer acts on the drive mechanism in the release position. According to an alternative embodiment, some of the force acting on the adjustment part is absorbed not by the drive mechanism but by at least one other part of the headrest. For example, at least some of the force acting on the adjustment part can be absorbed by the support.

The advantage of the invention is that the drive mechanism is not damaged by a high force acting on the adjustment part.

An embodiment is characterized in that the overload safety device has a coupling that can be moved from a coupling position into a decoupling position. The coupling can be part of the drive train for the adjustment part, for example. The coupling is provided with at least first and second coupling means that can be moved between a coupling position and a decoupling position. The coupling means are moved from the coupling position into the decoupling position, for example when a maximum force acting on the coupling parts is exceeded.

A first coupling means are on a spindle nut of the drive mechanism for the adjustment part, for example, and a second coupling means with a seat part for the spindle nut are formed on the support. The coupling can be designed in such a way that it can be moved back from the decoupling position into the coupling position. Alternatively, the coupling can be designed in such a way, for example, that it can only be moved from the coupling position into the decoupling position. This is the case, for example, when parts of the coupling are damaged or plastically deformed due to the movement into the decoupling position.

A further embodiment is characterized in that the coupling is provided on the first drive and/or on the second drive. For example, the coupling can be integrated into the first drive or into the second drive. The coupling can be formed between the first and the second drive for example.

Another embodiment of the invention is characterized in that the drive mechanism has a spindle and a spindle nut engaging the spindle. The spindle is part of the first drive, for example, and the spindle nut is part of the second drive. The spindle nut is provided with a support of the headrest for example. The spindle is fixed to the adjustment part for example. By turning the spindle, the adjustment part, for example, can then be moved relative to the part fixed to the back rest, for example the support. The spindle can be turned by a drive motor for example.

Another embodiment is characterized in that the coupling has a spring whose the elastic return force holds the coupling in the coupling position, for example in a spring seat part, by frictional connection and, when the maximum force acting on the adjustment part is exceeded, the coupling can move into the decoupling position to release the frictional connection.

The spring is connected with the spindle nut for example. The spring is securely retained on the spindle nut for example.

Another embodiment of the invention is characterized in that the spring is provided with first frictional connecting elements that can be engaged with second frictional connecting elements of a spring seat part in a frictionally connected releasable manner.

The overload safety device has a latch, for example, that is moved from an unlocked position into a locked position by movement of the coupling from the coupling position into the decoupling position, movement of the adjustment part being blocked in the locked position. In this way, the force acting on the adjustment part is absorbed by the latch and no longer acts on the drive mechanism.

For example, the latch has at least one first locking element that is fixed to the back rest and that can be engaged with at least one second locking element that is fixed to the adjustment part. The part that is fixed to the back rest is retained on a support for example. The first locking element is kept disengaged from the second locking element, for example by a retaining element. The retaining element is connected to the coupling, for example in such a way that, when the coupling moves into the decoupling position, it releases the first locking element so it can move into engagement with the second locking element.

The first locking element is formed by a slide, for example, and the second locking element by gear teeth for example. The slide is kept disengaged from the gear teeth by the retaining element for example. The slide can be biased for example into engagement with the gear teeth. The slide is kept disengaged from the gear teeth by a safety catch for example. By moving the coupling into the decoupling position, for example, the safety catch is pivoted and releases the slide, thus enabling it to move into engagement with the gear teeth.

BRIEF DESCRIPTION OF THE DRAWING

Further advantages of the invention can be seen with reference to an embodiment shown in the figure. In the drawing:

FIG. 12 is a schematic longitudinal section through the headrest taken along section line XII-XII in FIG. 4, FIG. 13 is a schematic section through a second embodiment of the headrest with the overload safety device in the starting position, FIG. 14 is a schematic section like FIG. 13 but with the overload safety device in the release position, FIG. 15 is a schematic section through a third embodiment of the headrest but with the overload safety device in the starting position, FIG. 16 is a schematic section through the third embodiment of the headrest in another sectional plane, FIG. 17 shows the headrest as in FIG. 15 but with the overload safety device in the release position, and FIG. 18 shows the headrest as to FIG. 16 but in the release position.

SPECIFIC DESCRIPTION OF THE INVENTION

Figure 1:
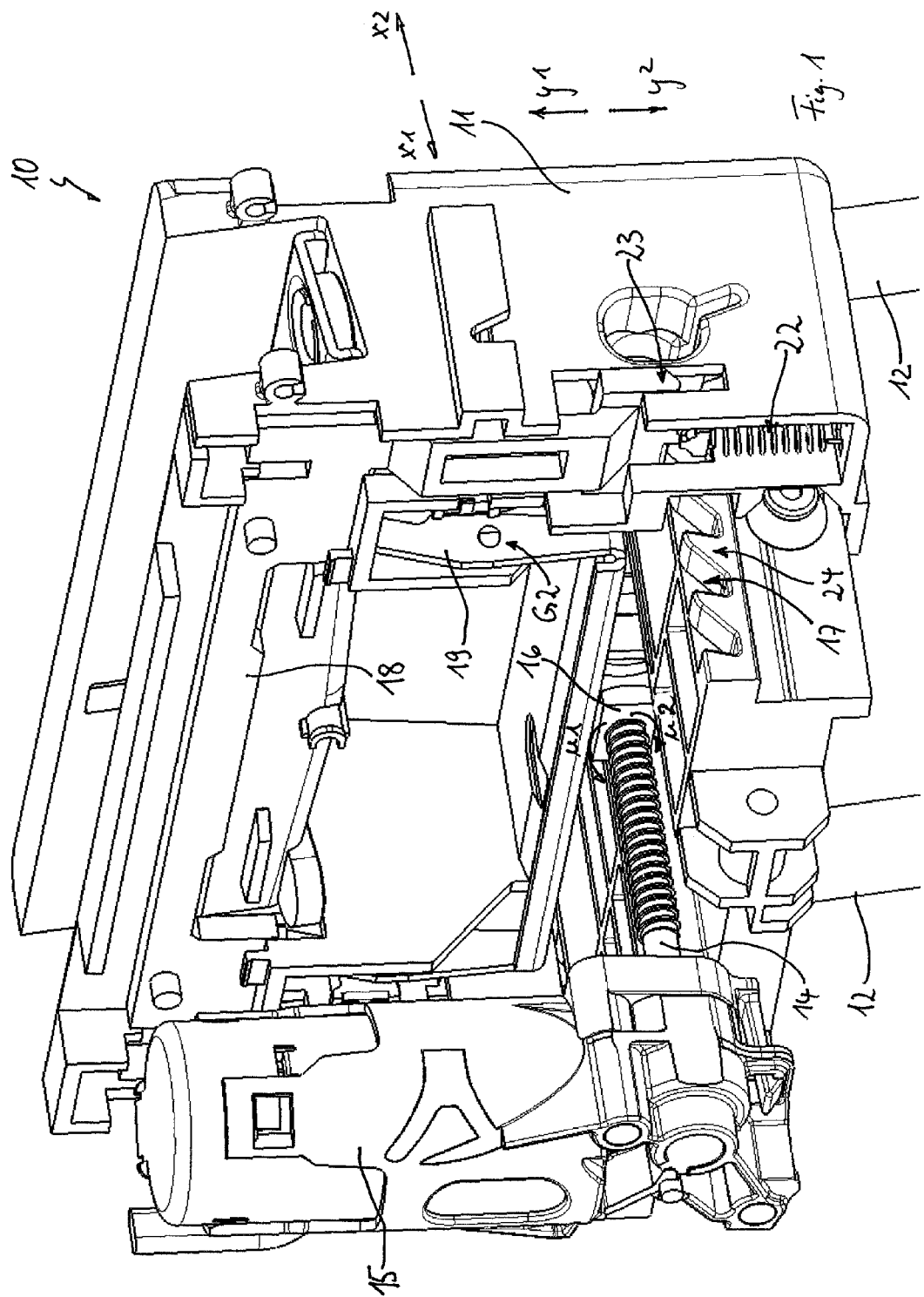
FIG. 1 is a perspective schematic diagram of the headrest according to the invention with an overload safety device in the starting position.

A headrest as a whole is shown in the drawing at 10. Identical references in the different figures designate the parts whether or not they are followed by lower-case letters.

The headrest 10 has a support 11 that is fixed to the back rest of a vehicle seat (not shown) by support rods 12. The support 11 can be vertically adjusted in directions y1, y2 in a manner not shown. This can be carried out, for example, by moving the support 11 relative to the rods 12. The headrest 10 further has a headrest section 13 that is mounted in the support 11 so that it can be moved in directions x1, x2. A spindle 14 that can be driven by a motor 15 in order to move the headrest section 13 in the directions x1, x2 is fixed to the headrest section 13.

Figure 3:
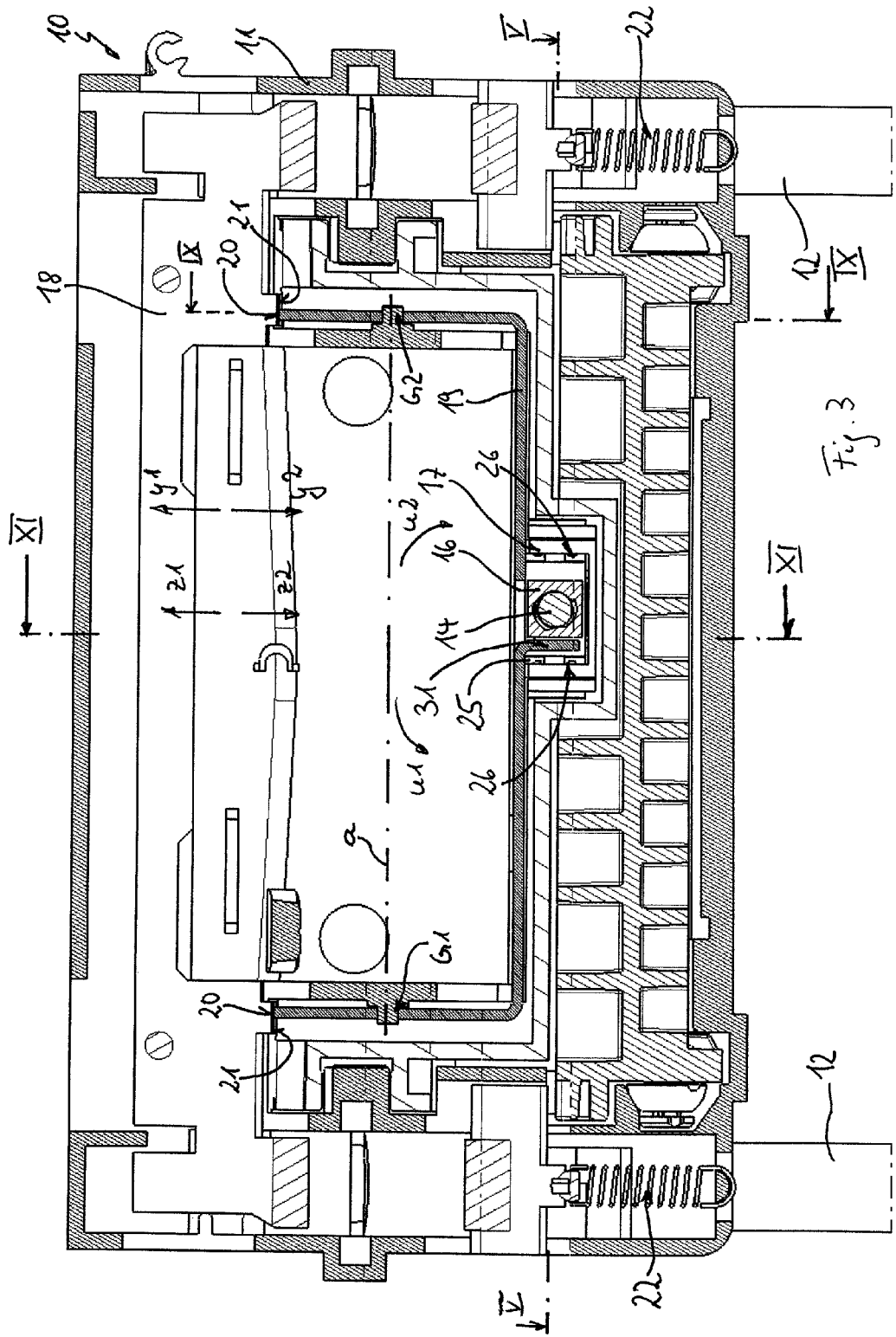
FIG. 3 is a schematic longitudinal sectional view of the headrest from behind with the overload safety device in the starting position.
Figure 4:
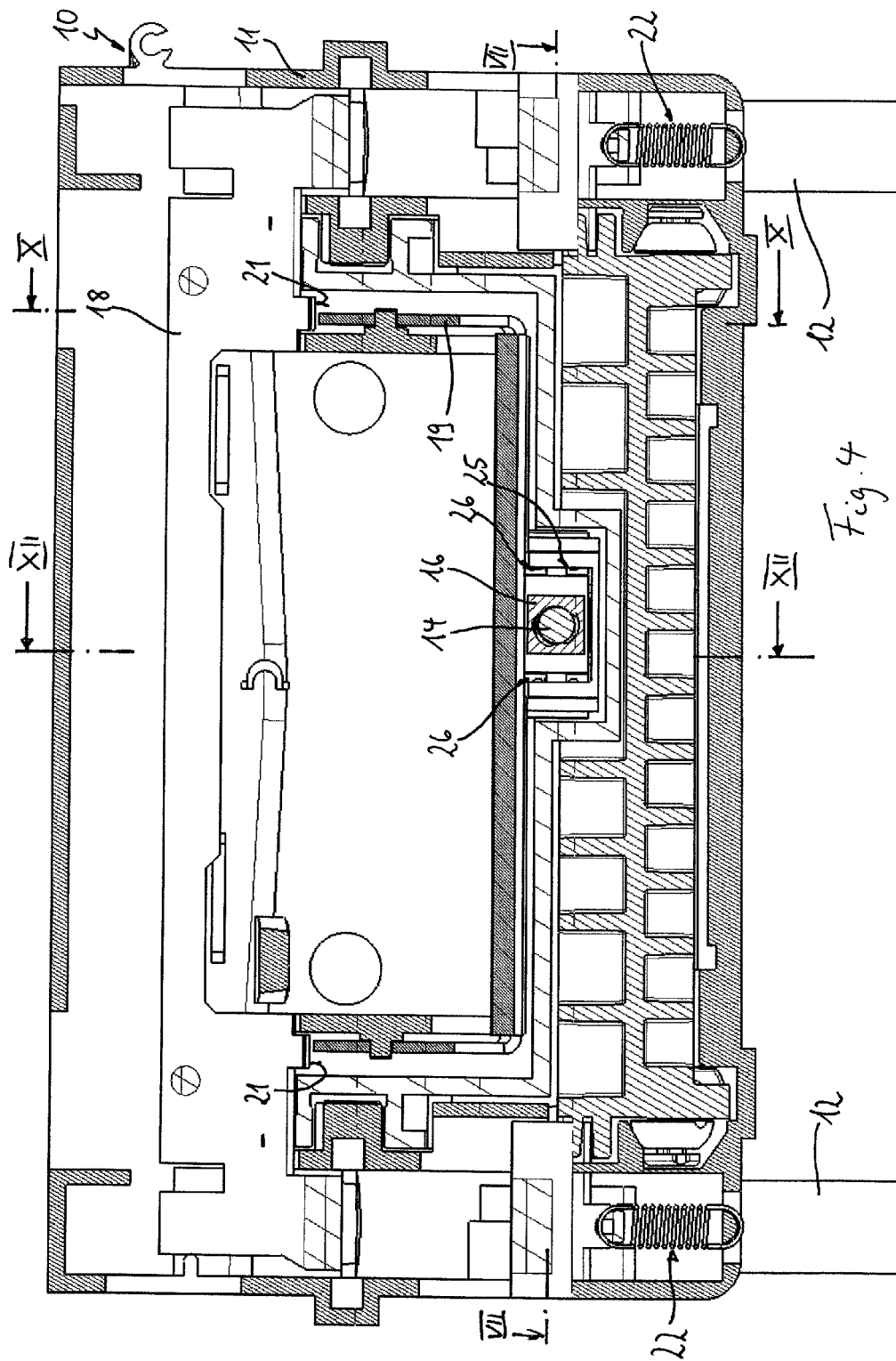
FIG. 4 shows the headrest as in FIG. 3 but with the overload safety device in the release position.
Figure 5:
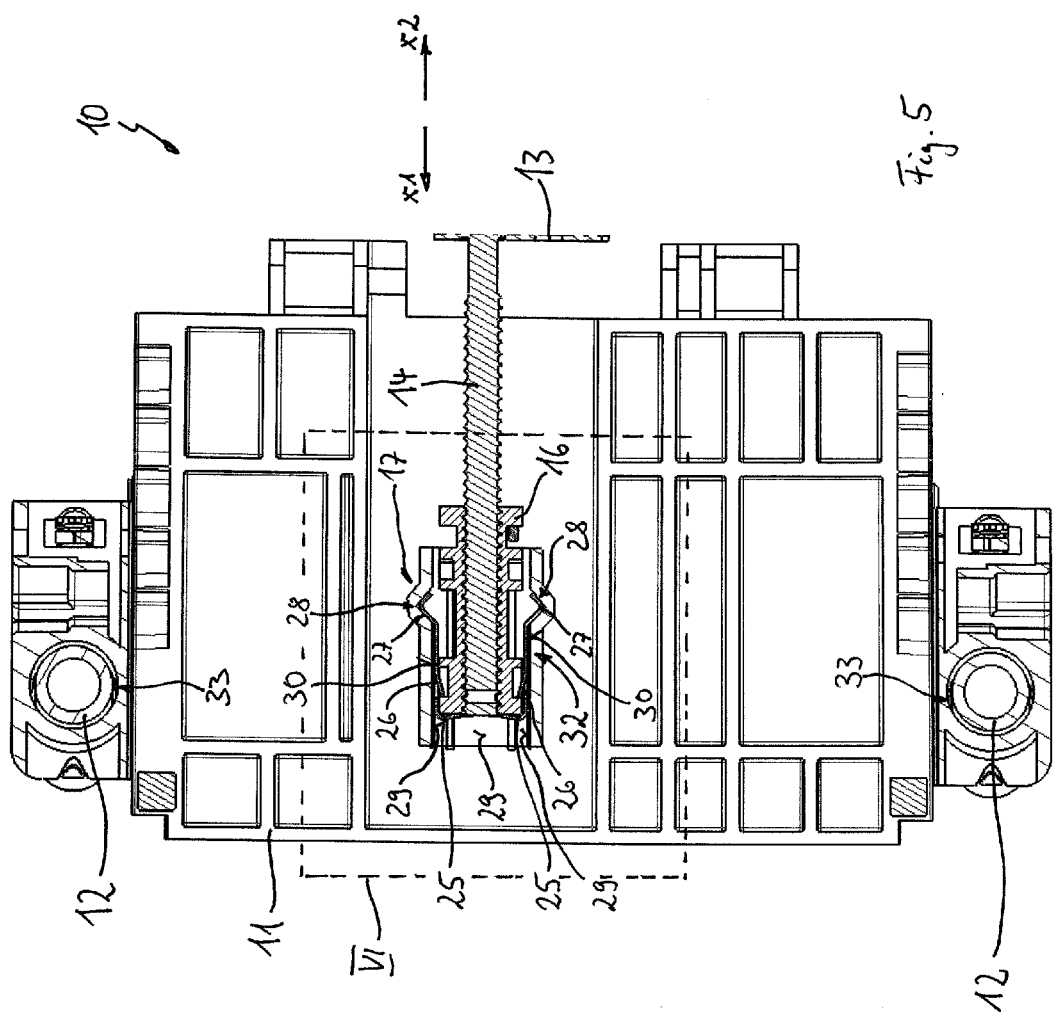
FIG. 5 is a schematic cross section taken along section line V-V in FIG. 3.
Figure 6:
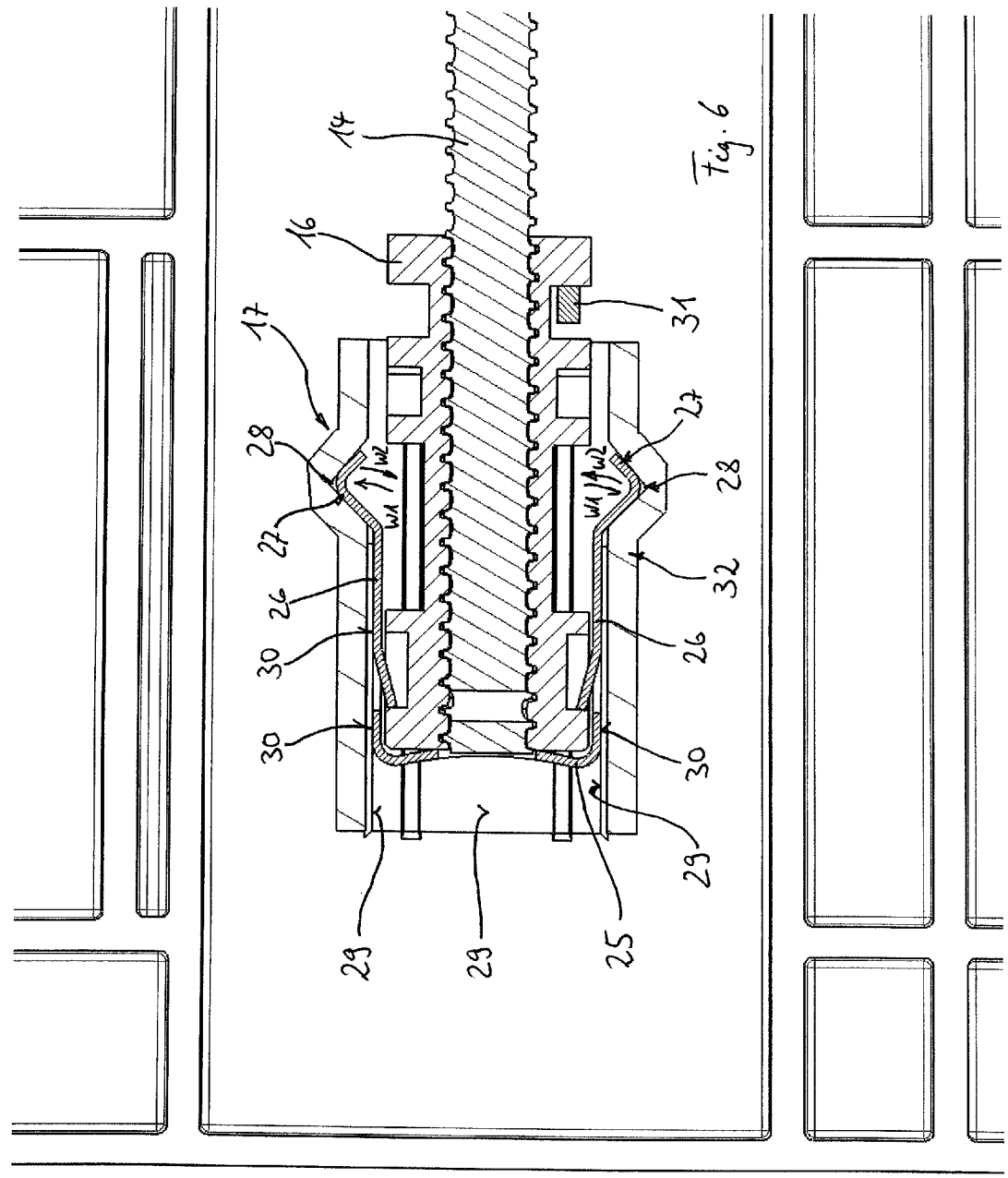
FIG. 6 is a large scale section taken along section line VI in FIG. 5.
Figure 7:
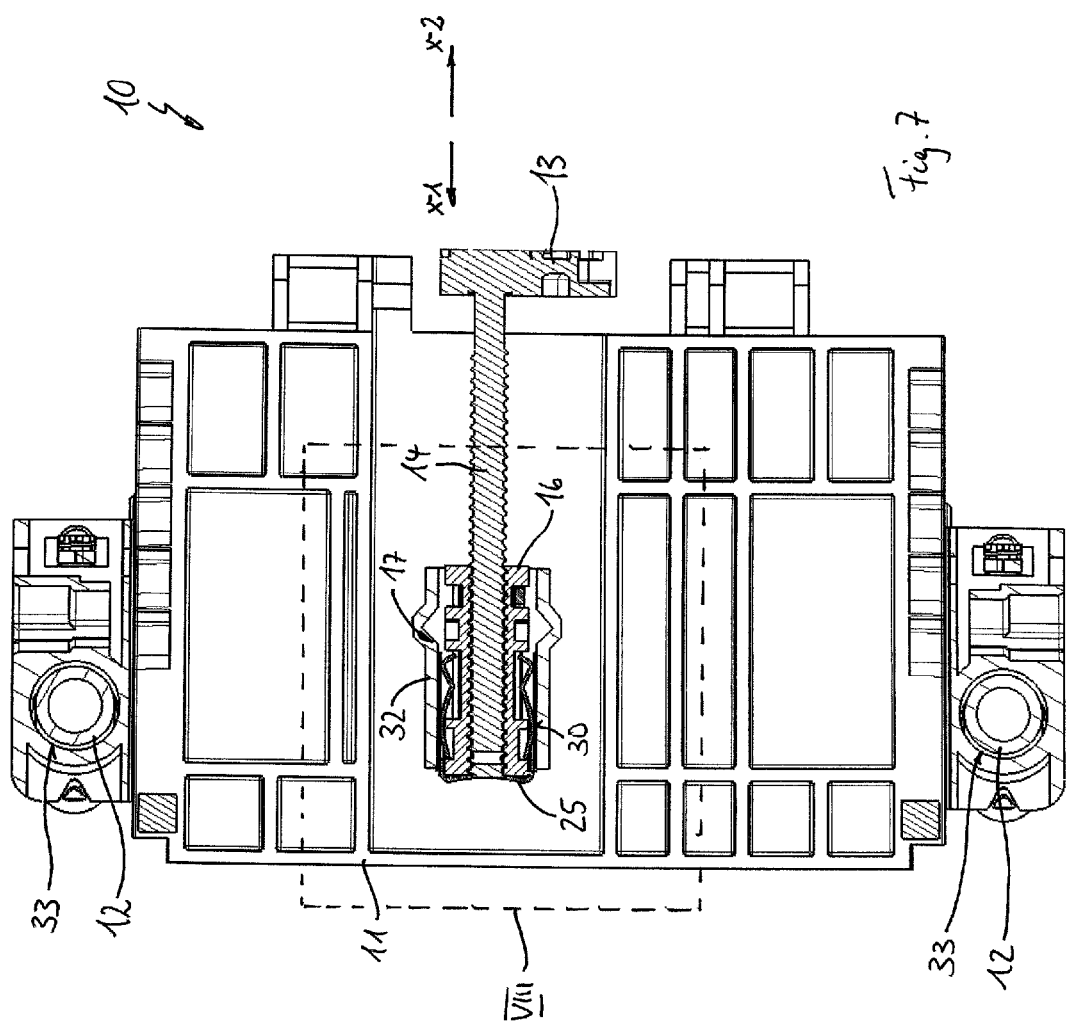
FIG. 7 is a schematic cross section taken along line VII-VII in FIG. 4.
Figure 8:
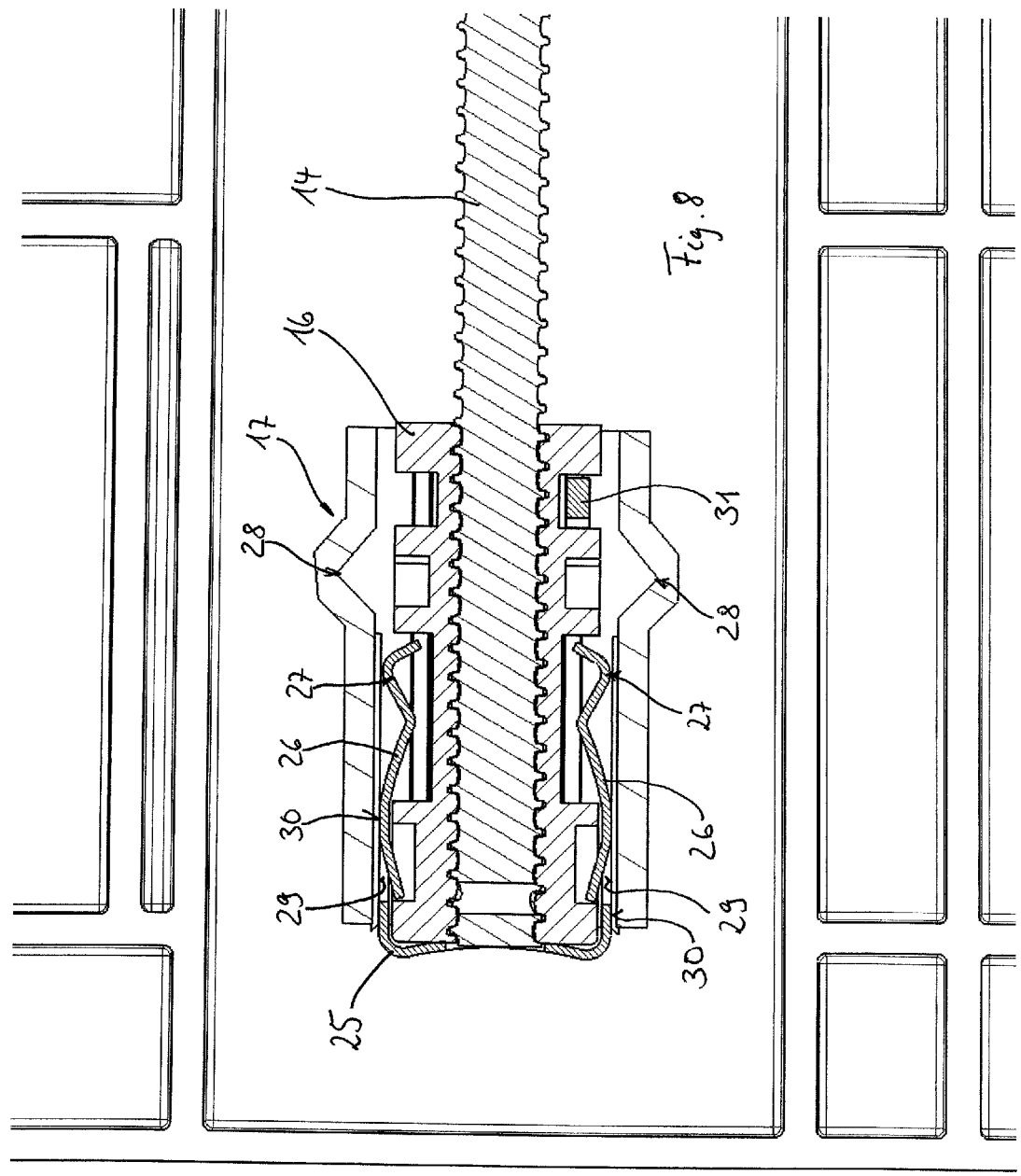
FIG. 8 is a large-scale section taken along section line VIII in FIG. 7.

A spindle nut 16 (see FIGS. 3 and 5) has an internal thread that engages with an external thread of the spindle 14. The spindle nut 16 is fixed to the support 11 so that the spindle 14 can be braced against the spindle nut 16. When the spindle 14 turns in a direction u1, the headrest section 13 is moved in the direction x1 and, when the spindle 14 turns in an opposite direction u2, the headrest section is moved in the opposite direction x2. Mounting formations 33 molded into the support 11 can also be seen in FIG. 5. The support 11 is mounted on the rods 12 by the mounting formations 33. The mounting formations 33 comprise ribs that guide the support on the rods 12.

An overload safety device 17 has a slide 18 and a safety catch 19. Together with the support 11, the safety catch 19 forms pivots G1 and G2 and, in this way, can be pivoted about an axis of rotation [a]. In a starting position of the overload safety device 17, support faces 20 of the safety catch 19 bear on holding faces 21 of the slide 18. The slide 18, which is mounted in the support 11 so that it can move in directions z1, z2 and is biased in the direction z2 by springs 22, therefore cannot move from the starting position shown in FIG. 1 in the direction z2 toward the locking position.

Figure 2:
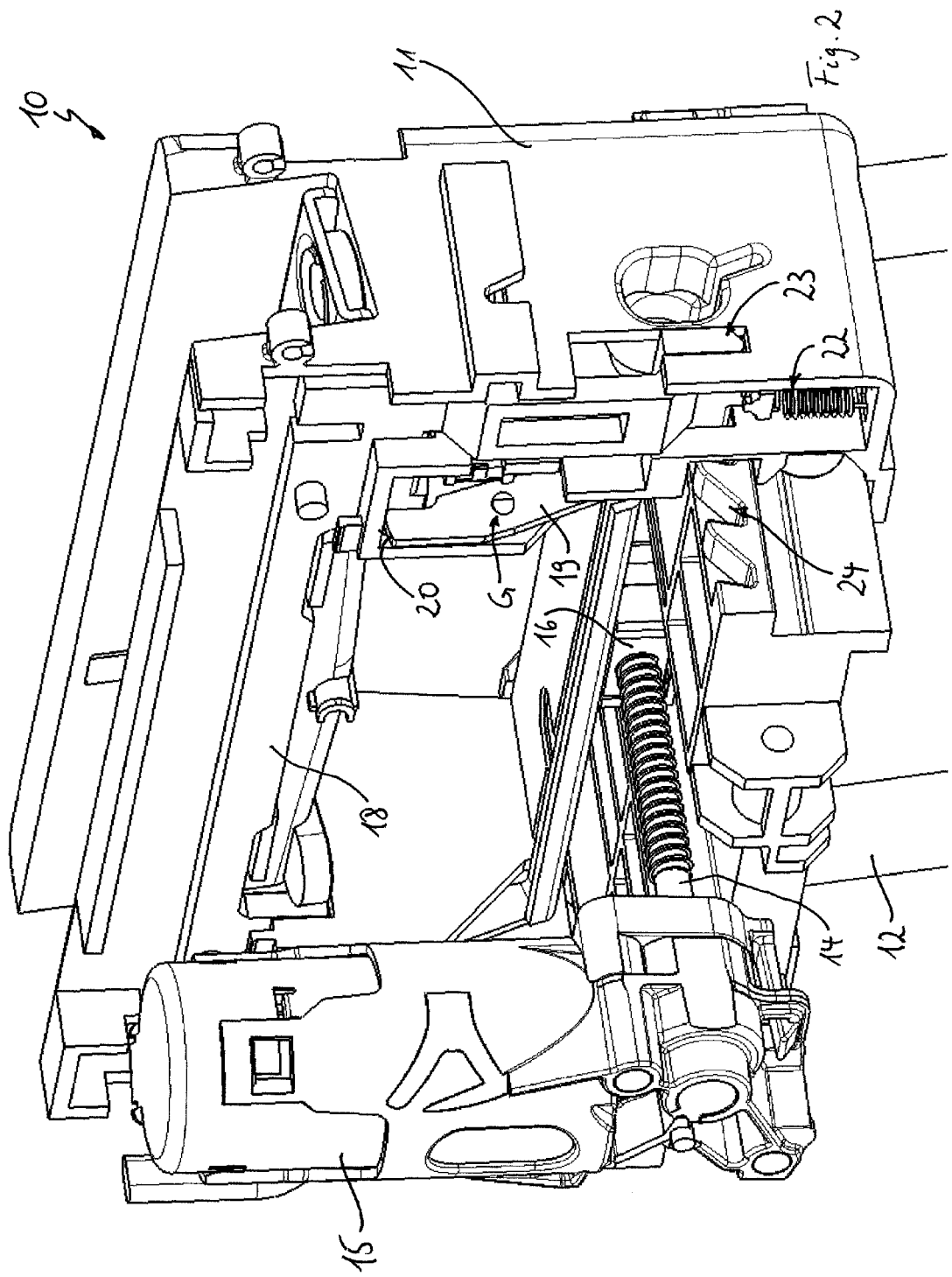
FIG. 2 shows the headrest as in FIG. 1 but with the overload safety device in the release position.

In the locking position shown in FIG. 2, stops 23 of the slide 18 do not engage with gear teeth 24 that are formed on the headrest section 13. In the release position of the headrest 10, which is brought about by overloading the headrest section 13 in direction x1, the stops 23 engage with the gear teeth 24.

A spring clip 25 is fixed to the spindle nut 16. The spring clip 25 has arms 26 provided with bumps 27 at their free ends. The bumps 27 are complementary to recesses 28 formed by a seat part 32 of the support 11. The seat part 32 also has guide surfaces 29 that are provided for guiding outer surfaces 30 of the spindle nut 16. The arms 26 are prestressed in a direction w1 and in this way are loaded with the recesses 28 in the direction of engagement. When a permissible highest force that is transmitted to the spindle nut 16 via the spindle 14 is exceeded, the arms 26 disengage from the recesses 28 in a direction w2 as a result of elastic deformation. The spindle nut 16 is then no longer retained in its seat part and outer surfaces 30 of the spindle nut 16 slide along the guide surfaces 29 in the direction x1 into the release position shown in FIG. [4].

Figure 9:
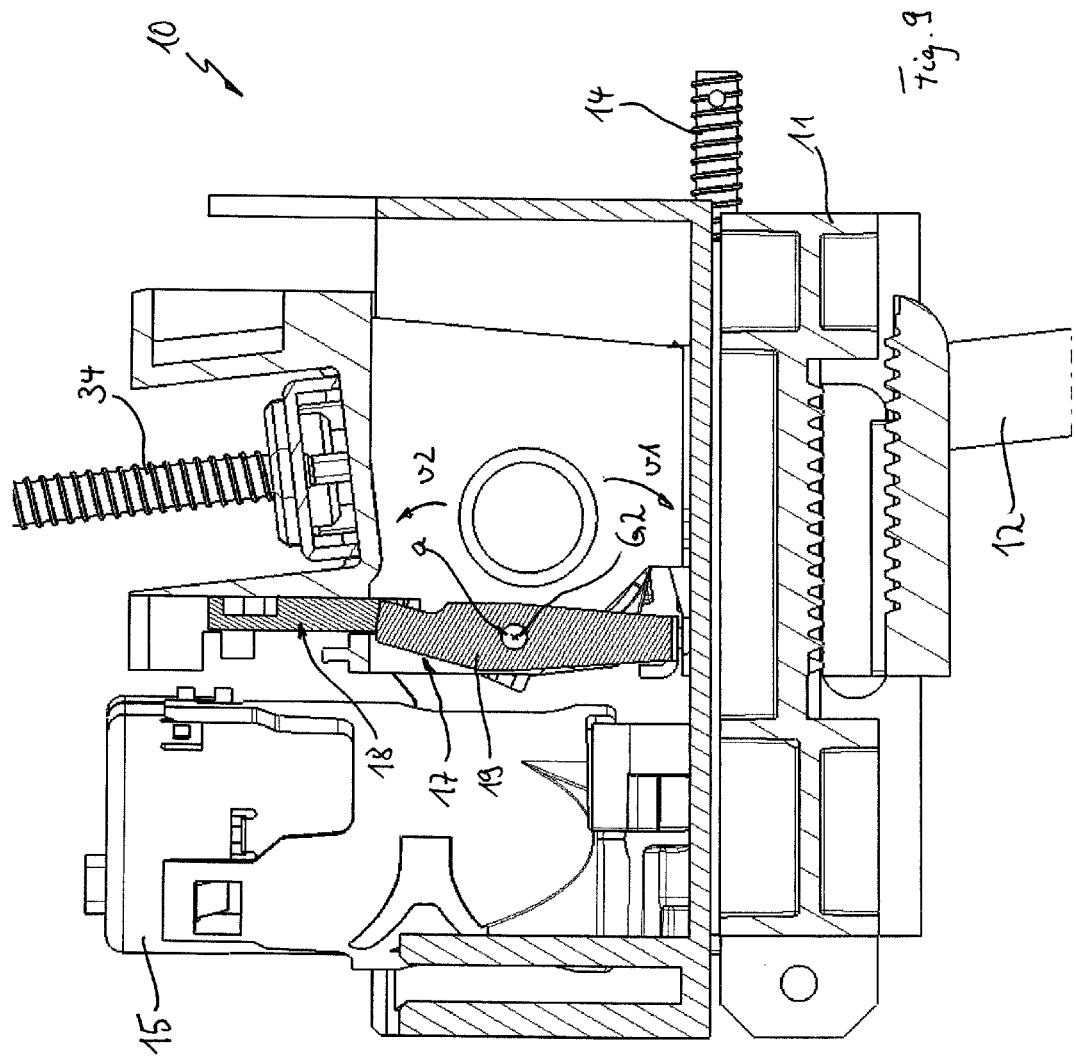
FIG. 9 is a schematic longitudinal section through the headrest taken along section line IX-IX in FIG. 3.
Figure 10:
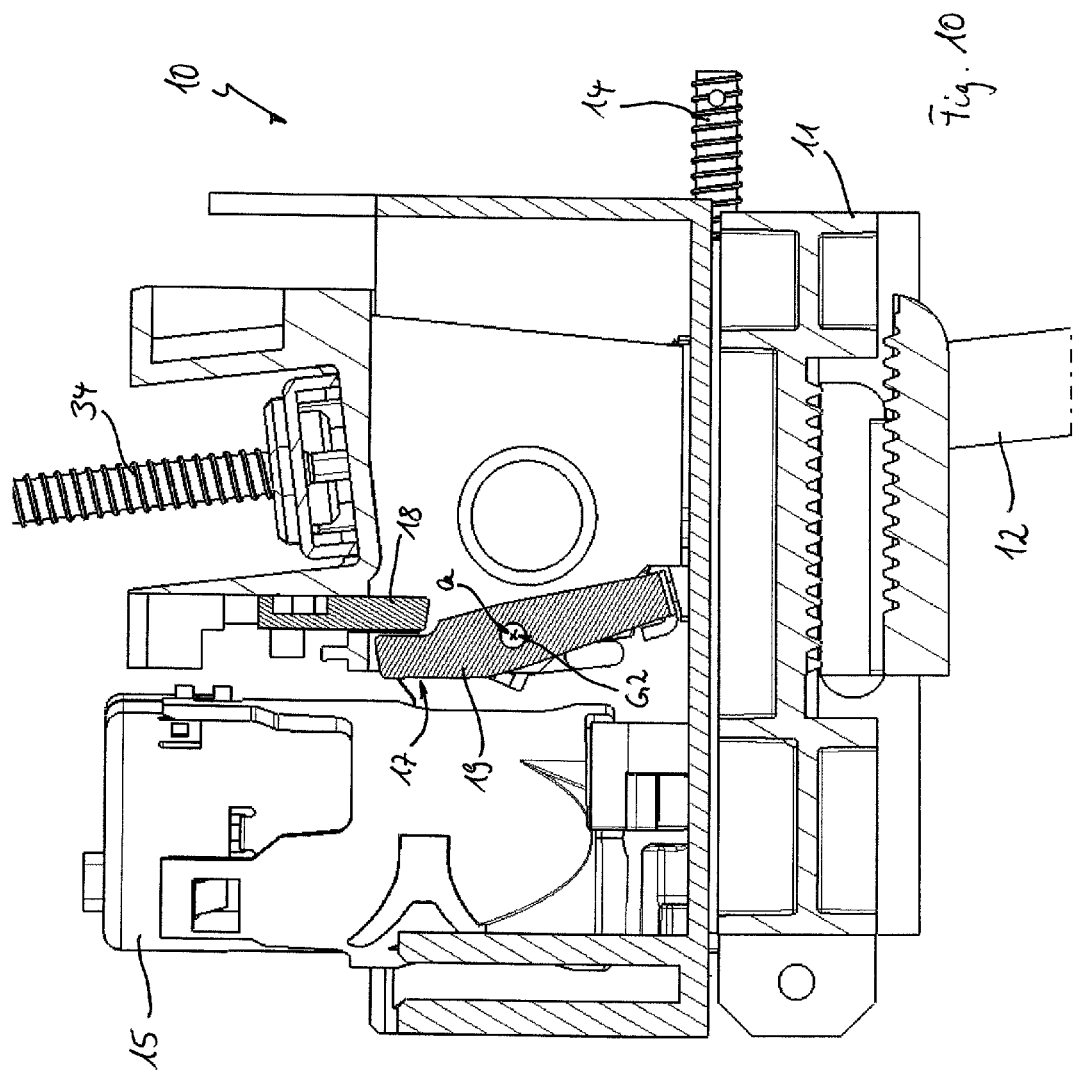
FIG. 10 is a schematic longitudinal section through the headrest taken along section line X-X in FIG. 4.
Figure 11:
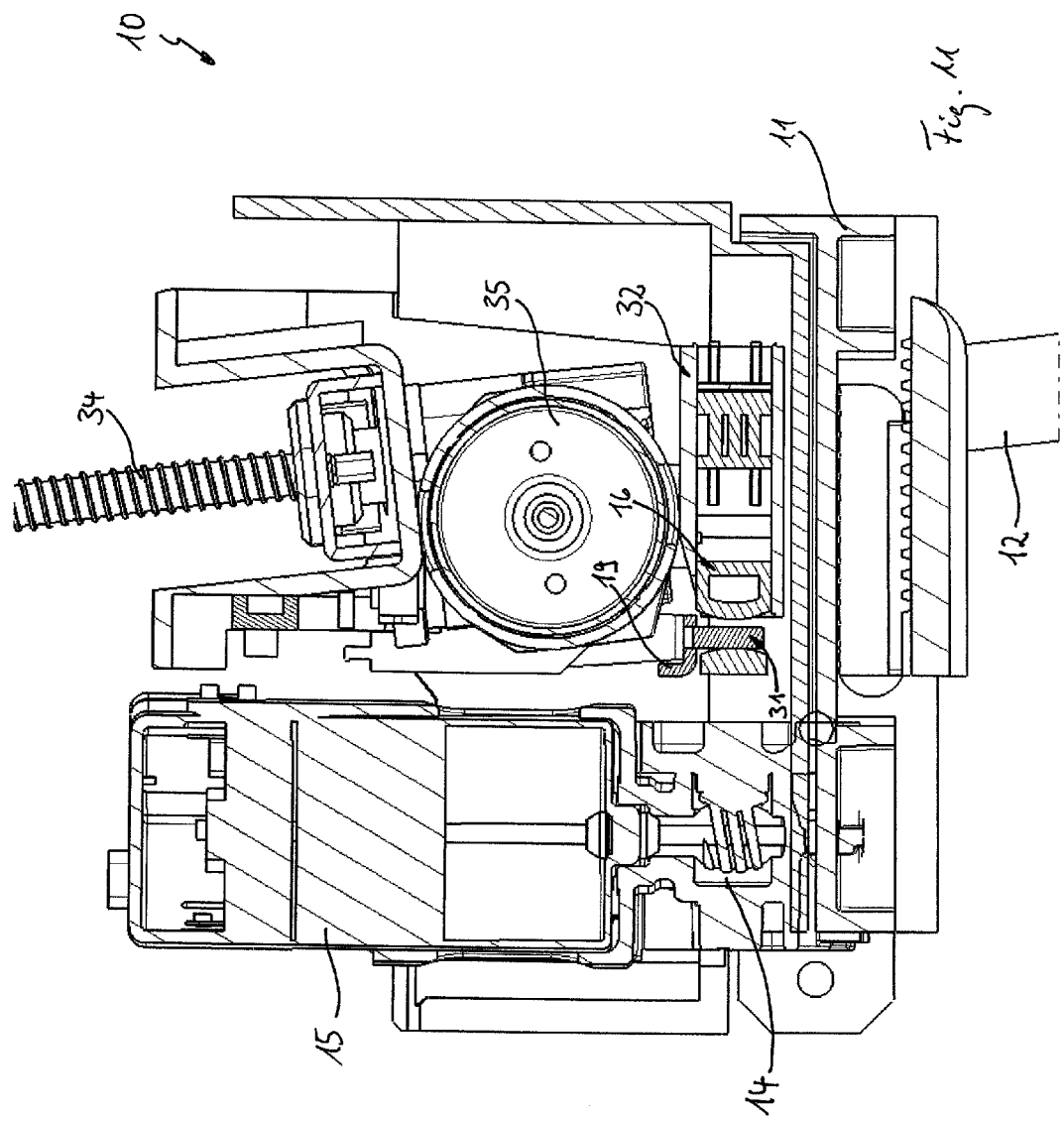
FIG. 11 is a schematic longitudinal section through the headrest taken along section line XI-XI in FIG. 3.

An arm 31 fixedly projecting from the safety catch 19 is connected to the spindle nut 16. Movement of the spindle nut 16 from the starting position into the release position pivots the safety catch 19 about the axis a in the direction v2 (see FIG. 9). This causes the support faces 20 to disengage from the holding faces 21. The slide 18 is moved by the springs 22 from the starting position in the direction z2 into the release position in engagement with the gear teeth 24. In the release position, because of the sawtooth shape of the gear teeth 24, which form a one-way locking mechanism, movement of the headrest section 13 is possible in the direction x2 but movement in the direction x1 is blocked.

In order to move the headrest 10 back into its starting position, the slide 18 must be moved in the direction z1 once more and the support faces 20 must be re-engaged with the holding faces 21 by pivoting the safety catch 19 back in the direction v1. Furthermore, the spindle nut 16 must be moved back into its seat part in the direction x2 until the bumps 27 are engaged with the recesses 28.

For the sake of completeness it must also be mentioned that the headrest 10 has a second drive for vertical adjustment and provided with a second spindle 34 and an electric motor 35.

A second embodiment is shown in FIGS. 13 and 14. The principle of operation of the headrest according to the second embodiment is basically the same as that of the first embodiment. The difference compared with the first embodiment is only that the spindle nut 16 is not connected to the slide by a safety catch. According to FIG. 13, the spindle 14 has an external thread that engages with an internal thread of the spindle nut 16. A slide 36 has a control element 37 that is fixed to the slide 36. In an alternative embodiment, the slide 36 and the control element 37 could also be of one piece. According to FIG. 13, the spindle nut 16 is in the travel path of the control element 37 when it is in its seat part 32. A contact surface 38 of the control element 37 rests against an outer surface 39 of the spindle nut 16. The slide 36, which is spring-biased in the direction y2, therefore cannot is move in the direction y2.

If the headrest section, which is not shown in FIG. 13, is overloaded, the spindle nut 16 is moved in the direction x1 out of its seat part 32 into the release position shown in FIG. 14. The spindle nut 16 is no longer in the travel path of the control element 37. The slide 36 can therefore move in the direction y2 into engagement with the gear teeth 24.

A third embodiment is shown in FIGS. 15 to 18. The principle of operation of the headrest according to the third embodiment is basically the same as that of the first embodiment. The difference is that a safety slide 40 that acts together with a slide 41 is provided instead of the safety catch 19.

The spindle 14 and the spindle nut 16 work the same as in the first embodiment. According to FIG. 15, the spindle nut 16 is in its seat part 32. A safety slide 14 is mounted so that it can be moved in the directions x1, x2 and is movably connected to the spindle nut 16. The safety slide 40 has a blocking cam 42 (see FIG. 16) that, in the starting position of the overload safety device according to FIG. 16, is in the travel path of the slide 41. In this way, the slide 41 is kept out of engagement with the gear teeth 24.

If the spindle nut 16 is moved in the direction x1 into the release position as a result of overload on the headrest section, which is not shown in FIG. 15, the safety slide 40 likewise moves in the direction x1 due to the movable coupling. The release position is shown in FIGS. 17 and 18. The spindle nut 16 has moved out of its seat part 32. The safety slide 14 has likewise moved in the direction x1 relative to the position shown in FIGS. 15 and 16. The blocking cam 42 is no longer in the travel path of a retaining region 43 of the slide 41. As the slide 41 is spring-biased in the direction y2, it moves in the direction y2 into engagement with the gear teeth 24. The headrest section is then locked and can no longer be moved in the direction x1.

The invention claimed is:

1. A headrest retained on a vehicle seat part, the headrest comprising:
    at least one headrest adjustment part carried on and movable relative to the seat part;
    at least one drive mechanism for moving the adjustment part relative to the seat part and comprising a first drive having at least one first drive element that is fixed to the adjustment part and a second drive having a second drive element that is fixed to the seat part;
    an overload safety device having a coupling connected between one of the drive elements and the respective part and movable between a coupling position coupling the one drive element to the respective part and a decoupling position decoupling the one drive element from the respective part when a force acting on the adjustment part exceeds a limit;
    a latch in the overload safety device and movable between an unlocked position permitting movement of the adjustment part and a locked position blocking movement of the adjustment part; and
    a connection between the coupling and the latch that moves of the latch from the unlocked position into the locked position by movement of the coupling from the coupling position into the decoupling position.

2. The headrest defined in claim 1, wherein the drive elements are a spindle and a spindle nut engaged by the spindle.

3. The headrest defined in claim 2, wherein the overload safety device has a spring that holds the device in the coupling position and, when the maximum force is exceeded, the device can be moved into the decoupling position by deformation of the spring.

4. The headrest defined in claim 3, wherein the spring is provided with first frictional connecting elements that can be engaged with second frictional connecting elements of a spring seat part in a frictionally connected releasable manner.

5. The headrest defined in claim 1, wherein the latch has at least one first locking element that is fixed to the seat part and that can be engaged with at least one second locking element that is fixed to the adjustment part.

6. The headrest defined in claim 5, wherein the first locking element is formed by a slide and the second locking element by gear teeth.

7. A headrest that is retained on a vehicle seat part, the headrest comprising:
    at least one adjustment part carried on and movable relative to the seat part;
    at least one drive mechanism for moving the adjustment part relative to the seat part and comprising a first drive having at least one first drive element that is fixed to the adjustment part and a second drive having a second drive element that is fixed to the seat part and that directly and permanently engages the first drive element, the drive elements being a spindle and a spindle nut thereon; and an overload safety device connected between one of the drive elements and the respective part and movable without disengaging the drive elements from each other between a coupling position coupling the one drive element to the respective part and a decoupling position decoupling the one drive element from the respective part when a force acting on the adjustment part exceeds a limit for, in the decoupling position of the overload safety device, at least partially relieving the drive mechanism of the force acting on the adjustment part, the overload safety device having on the spindle nut a spring that holds the overload safety device in the coupling position and, when the maximum force is exceeded, allows the device to move into the decoupling position by deformation of the spring.

* * * * *